3,259,180
CONSTANT TEMPERATURE INFRARED
RADIATION SOURCE
Paul E. Suit, Ontario, and Walthew T. Barnes, San
Gabriel, Calif., assignors to General Dynamics Corporation, a corporation of Delaware
Filed Oct. 21, 1965, Ser. No. 499,473
9 Claims. (Cl. 165—104)

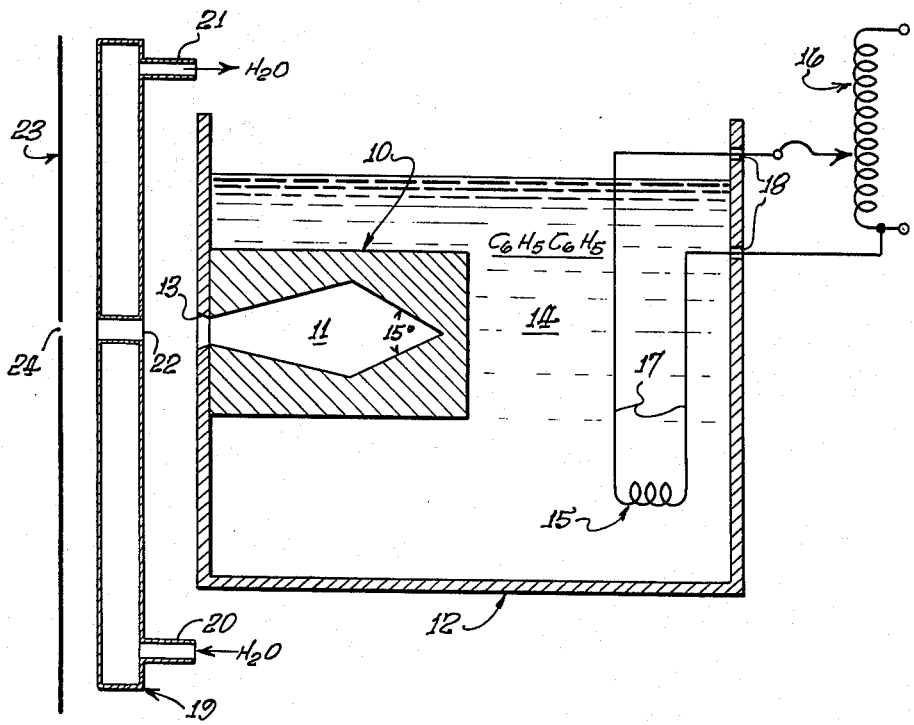

This invention relates to a black body radiation source, and more particularly to a constant temperature, black body source of infrared radiation.

Infrared measurement techniques involving passive, or active targets require a standard radiation reference source to permit the identification of absolute radiation levels. In radiometry and in detection and tracking systems which use target radiation, the calibration of the equipment usually requires a standard source of radiation of known intensity and spectral distribution. An ideal source of this type which provides a radiation having a well-known theoretical relationship with temperature is the so-called black body. This type of radiator has characteristics which approach these theoretical relationships and is therefore used as a radiation reference source. Such a simulator usually consists of an electrically heated radiator and a temperature controller.

One of the problems of the black body type radiation sources has been in providing a constant temperature and in repeatability of the source.

The present invention overcomes the problems of the prior known sources and provides a simple, inexpensive, constant-temperature black body source suitable for providing a secondary standard for point checking infrared radiation radiometers and other infrared radiation detection devices. This is accomplished by utilizing a material which, upon reaching the boiling point, maintains a constant temperature which is a function of the inherent properties of the fluid and the atmospheric pressure, and which is always repeatable providing compensation is made for barometric changes.

Therefore, an object of this invention is to provide an infrared radiation source.

A further object of the invention is to provide an economical, highly effective black body radiation source.

Another object of the invention is to provide a constant temperature, black body source of infrared radiation.

Another object of the invention is to provide a black body source at a temperature which is fixed by the laws of nature and is always repeatable while not requiring complex controls and readout devices for determining and controlling the temperature.

Another object of the invention is to provide a simple, inexpensive, constant-temperature black body source for providing a secondary standard for point checking IR radiometers and other IR detection devices.

Another object of the invention is to provide a radiation source which utilizes a heating material which has a fixed boiling point and retains this property after repeated applications thus providing the radiation source for an IR secondary standard or for point checking IR devices.

Other objects of the invention, not specifically set forth above, will become readily apparent to those skilled in the art from the following written description and accompanying drawing wherein:

The single figure diagrammatically illustrates the invention.

Generally, this invention, as illustrated, relates to a constant-temperature, black body source of infrared radiation comprising a double, reversed, 15° conical cavity formed in a copper block, a vessel containing a biphenyl compound fluid in which the block is immersed, an electrical heating element for the fluid, an autotransformer variac controlling the heating element for maintaining the fluid at constant temperature, and a water-circulating baffle plate and an apertured plate for respectively isolating and masking off all radiation from the system except that from the black body. The biphenyl or diphenyl fluid will remain at a constant temperature as long as it is kept boiling so that the device provides a stable, constant-temperature, black body source that is repeatable without complex controls.

Referring now to the drawing, a black body source or radiator 10 having a double reversed 15° conical cavity 11 is positioned on a sidewall of a container or vessel 12, cavity 11 of source 10 being aligned with an aperture 13 in the vessel 12. Black body source 10 may be constructed of a block of copper or other suitable materials.

A fluid 14 such as a biphenyl (diphenyl) compound, $C_6H_5C_6H_5$ which has a boiling point of 254° C. or 527° K. at standard atmospheric pressure is located in vessel 12. While this specific fluid is set forth as exemplary, any fluid may be utilized which, when raised to the boiling point, will maintain a constant temperature as long as it is kept at the boiling point and constant atmospheric pressure; and the temperature thereof will always be repeatable. For example, $H_2O$ (distilled or deionized water) can be used for a lower temperature.

Positioned in container or vessel 12 is an electric heating element 15 which functions to raise the temperature of the fluid 14 to the boiling point and is connected to an autotransformer variac 16 via leads 17 which extend through apertures 18 in vessel 12, variac 16 being connected to a power source (not shown) and functioning to set and control the power supplied to the electric heating element to keep the fluid 14 at the boiling point. Since variacs of this type are well known in the art, a detailed description thereof is deemed unnecessary.

Located externally of and adjacent to the sidewall of container or vessel 12 which supports the black body source 10 is a baffle plate member 19 which is fluid cooled by water or other suitable material by the passage of coolant therethrough from inlet 20 to outlet 21. An aperture 22 is provided in baffle plate member 19 and aligns with aperture 13 of vessel 12 and with cavity 11 of source 10. Baffle plate 19 functions to isolate radiation from the vessel 12.

A plate 23 having an aperture 24 is positioned adjacent baffle plate member 19 so that aperture 24 thereof aligns with aperture 22 of member 19 and serves to mask off all radiation except that emitting from the black body source 10.

In operation, power is supplied via variac 16 to heating element 15 which heats the fluid 14 to its boiling point and maintains the fluid 14 at that temperature. The hot fluid 14 heats the block of copper or other suitable material thereby creating a constant temperature black body source 10 which emits radiation from cavity 11 through apertures 13, 22 and 24 of vessel 12, baffle member 19 and plate 23, respectively, the baffle plate member 19 and plate member 23 isolating and masking off all radiation except that emitting from the black body source. Thus a black body radiator for an IR secondary standard is provided by this invention.

The basic advantage of the device of this invention is that it provides a black body source at a temperature which is fixed by the laws of nature. It is always repeatable and does not require complex controls and readout devices for determining and controlling the temperature.

As pointed out above, the fluid exemplified (biphenyl or diphenyl) is preferred because of its stability and physical characteristics, although this invention is not limited to this fluid; and as pointed out above, any fluid or material which can be raised to the boiling point can be used as long as it maintains a stable composition with repeated heating and cooling cycles.

It is thus seen that this invention provides a device which utilizes a material which has a fixed boiling point and retains this property after repeated application and can be used to provide a fixed temperature for controlling a black body radiator for an infrared radiation secondary standard or for point checking infrared radiation devices.

Although a particular embodiment of the invention has been illustrated and described, modifications and changes will become apparent to those skilled in the art, and it is intended to cover in the appended claims all such modifications and changes as come within the true spirit and scope of this invention.

What we claim is:

1. A constant-temperature black body source of infrared radiation comprising: a vessel containing a fluid which, when raised to the boiling point, will maintain a constant temperature as long as it is kept at the boiling point and constant pressure; radiator means constructed of suitable material operatively mounted in said vessel, said radiator means having a cavity adjacent to and aligned with an aperture in said vessel; means for heating said fluid to its boiling point; means for controlling said heating means; baffle means located adjacent said vessel aperture; a plate located adjacent said baffle means, said baffle means and said plate being provided with apertures therethrough which align with said aperture of said vessel, whereby all radiation is isolated or masked off except that emitted from said cavity of said radiator means.

2. The constant-temperature black body source of infrared radiation defined in claim 1, wherein said fluid consists essentially of $C_6H_5C_6H_5$.

3. The constant-temperature black body source of infrared radiation defined in claim 1, whereby said fluid consists essentially of distilled water.

4. The constant-temperature black body source of infrared radiation defined in claim 1, wherein said radiator means consists essentially of copper.

5. The constant-temperature black body source of infrared radiation defined in claim 1, wherein said cavity of said radiator means has a double reversed 15° conical configuration.

6. The constant-temperature black body source of infrared radiation defined in claim 1, wherein said baffle means is fluid cooled.

7. The constant-temperature black body source of infrared radiation defined in claim 1, wherein said heating means is an electrical heating element.

8. The constant-temperature black body source of infrared radiation defined in claim 1, wherein said controlling means is an autotransformer variac.

9. The constant-temperature black body source of infrared radiation defined in claim 1, wherein said fluid is of the type that maintains a stable composition with repeated heating and cooling cycles.

References Cited by the Examiner

UNITED STATES PATENTS 2,156,352   5/1939   Peterson _____ 122—32 X
3,018,397   1/1962   Bronco et al. _____ 165—133 X

FOREIGN PATENTS 216,056   7/1958   Australia.

ROBERT A. O'LEARY, *Primary Examiner.*

M. A. ANTONAKAS, *Assistant Examiner.*